May 3, 1938.  C. GROSS  2,116,022
ROTATING VALVE FOR INTERNAL COMBUSTION ENGINES
Filed May 15, 1936  2 Sheets-Sheet 1
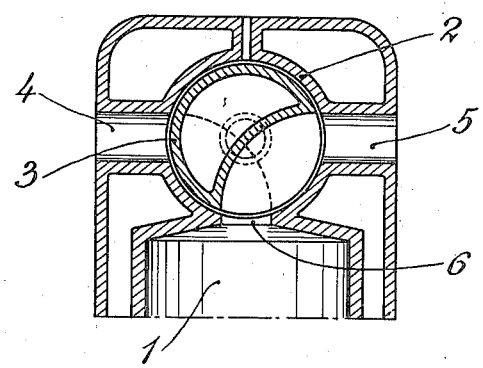
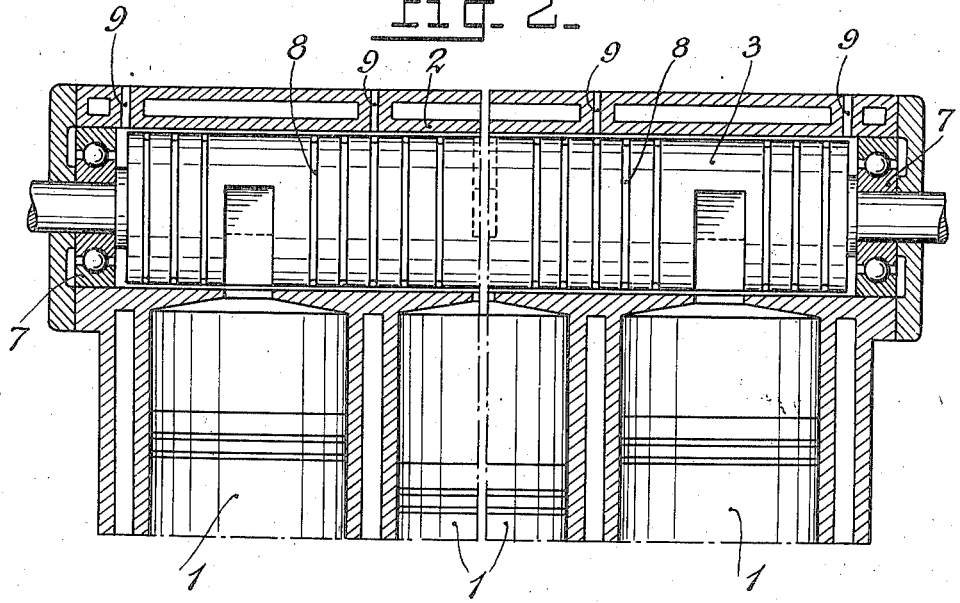
Inventor:
C. Gross
By C. F. Wenderoth
Atty Patented May 3, 1938

2,116,022

UNITED STATES PATENT OFFICE 2,116,022

ROTATING VALVE FOR INTERNAL COMBUSTION ENGINES

Court Gross, Oslo, Norway, assignor to Motoraktieselskapet, Oslo, Norway

Application May 15, 1936, Serial No. 80,004
In Norway June 13, 1935

1 Claim. (Cl. 123—190)

In the use of rotating cylindric or tubular valves in connection with internal combustion engines it has been found difficult to obtain satisfactory tightening between coaxial cylindric surfaces which rotate relatively to each other.

It has been suggested to obtain the necessary tightening by making the rotating surfaces slightly conical, and it has also been suggested to use packings of different kinds as well as yielding elastic tightening rings of the same type as are used in connection with pistons.

It has also been suggested that the necessary tightening might be obtained by the use of neat fitting elements, the cylindrical surfaces being provided with means of lubrication in the ordinary manner.

The last mentioned way of obtaining the necessary tightening is however unsatisfactory owing to the different heat expansion of the elements in question, with the result that high friction and wear of the parts in question is developed.

The present invention is based on the recognition of the fact that it is possible in rotating valves of this kind to obtain satisfactory tightening without the use of packings or tightening rings and without providing a neat fit between the different parts of the valve.

It has been found that it is possible to achieve the necessary tightening in an annular space between two coaxial cylindrical surfaces by means of a film of oil in that space, the oil film acting as an elastic packing between the rotating surfaces.

The difference between the diameters of the two coaxial cylindric surfaces between which tightening is to be obtained in accordance with the present invention is made from 10–50 times bigger than the difference in diameter used in the case of neat fitting parts, the difference of diameters in the latter case being generally about 0.02 mm., whereas the difference in diameter in accordance with the present invention is 0.1 and up to 1 mm.

By using this large difference between the diameters of the parts in question all risk of contact and friction between the surfaces in question is avoided, even in the case of extensive expansion or contraction owing to different temperatures.

Figure 3:
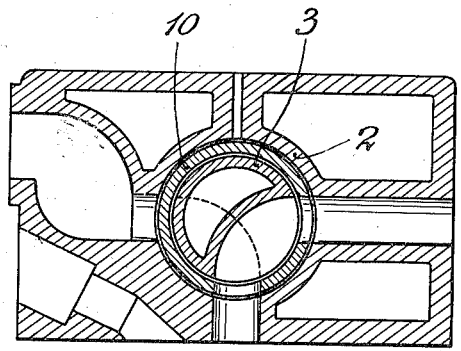
Figure 4:
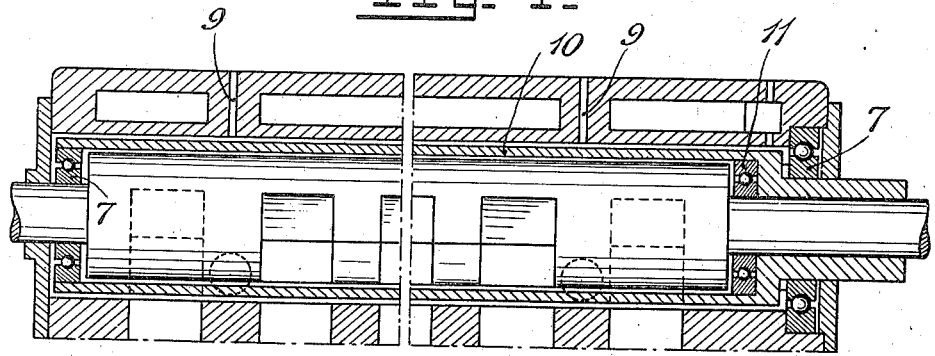

Two forms of the invention are diagrammatically illustrated on the drawings, Figures 1 and 2 being cross sectional view and coaxial sectional view of a rotating valve with a single rotating cylindrical valve body in a cylindric valve housing, whereas Figures 3 and 4 are corresponding views of an embodiment in which a tubular rotating valve operates in the annular space between a stationary water cooled core and a coaxial cylindrical valve housing enclosing the same.

In accordance with the embodiment illustrated on Figures 1 and 2 there is located above the cylinders 1 a cylindric valve housing 2, extending over all cylinders and in which there is placed a rotating valve body 3, which is provided in the usual manner with channels or depressions in order to connect the intake and outlet openings 4 and 5 with the opening 6 leading from the valve housing to the cylinder.

The rotating valve body is mounted in ball bearings 7 and passes through the valve housing 2 without supports or packings. Between the cylinders the rotating valve body 3 is provided with grooves 8 in order to provide storage spaces for the tightening oil located between the rotor and the inner wall of the valve housing. 9 are channels for supplying oil.

In accordance with the embodiment illustrated on Figures 3 and 4 the valve body 3, which is provided with channels, is mounted stationarily in the valve housing 2, and in the space between the valve housing and the stationary body 3 there is located a rotating tubular valve body 10 mounted in ball bearings 7, 11, and so dimensioned that it does not touch the inner body 3 nor the inner surface of the valve housing.

As it will be understood the invention may be applied also on rotating valves with more than one rotating tubular valve body.

I claim:

A rotating valve for internal combustion engines, in which no packings are provided between the rotating cylindrical valve body and the enclosing cylindric surface, in which the difference between the exterior diameter of the rotating valve body and the interior diameter of the enclosing cylindrical surface is not less than 0.1 and does not exceed 0.5 millimetres, the necessary tight fit between the valve body and the enclosing surface being obtained by maintaining a film of oil in the space therebetween.

COURT GROSS.